H. HESS.
STABILIZER FOR VEHICLES.
APPLICATION FILED JUNE 7, 1916.

1,222,401.

Patented Apr. 10, 1917.

Witnesses
J. T. L. Wright
P. M. Smith

Inventor
Herbert Hess
By Victor J. Evans
Attorney

UNITED STATES PATENT OFFICE.

HERBERT HESS, OF HUNTINGTON, NEW YORK.

STABILIZER FOR VEHICLES.

1,222,401. Specification of Letters Patent. Patented Apr. 10, 1917.

Application filed June 7, 1916. Serial No. 102,358.

*To all whom it may concern:*

Be it known that I, HERBERT HESS, a citizen of the United States, residing at Huntington, in the county of Suffolk and State of New York, have invented new and useful Improvements in Stabilizers for Vehicles, of which the following is a specification.

This invention relates to stabilizers for vehicles, the broad object of the invention being to provide means interposed between the running gear and body of the machine whereby the up and down movement of the body at both sides thereof is equalized. In the ordinary arrangement of springs for supporting a vehicle body in relation to the running gear and axles, each spring operates independently of the other one at the opposite side thereof thereby causing the body to tilt to one side or the other which produces a violent twisting strain on the body or the supporting frame, resulting in deterioration of the body and all parts connected with the same, also throwing greater strain on the wheels, axles and remainder of the under structure, and, in the case of automobiles or motor driven vehicles, nearly all of the mechanism arranged under the body is also subjected to strains and twisting actions. The object of the present invention is to overcome the difficulties and objections above noted by enforcing an equal up and down movement of the body supporting frame so that the springs at opposite sides of the frame mutually contribute to the support of the body and also serve to provide equal traction of both of the driving wheels.

With the above and other objects in view, the invention consists in the novel construction, combination and arrangement of parts, as herein described, illustrated and claimed.

In the accompanying drawings:—

Figure 1:
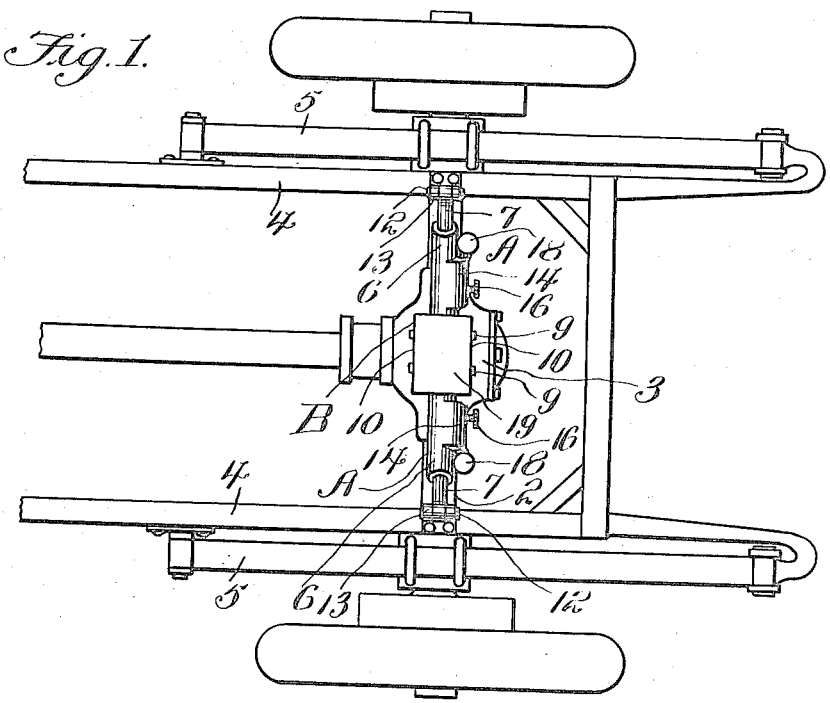
Figure 1 is a fragmentary plan view of a sufficient portion of the body supporting frame and under structure of an automobile to illustrate the present invention in its applied relation thereto.

Referring to the drawings 1 designates a vehicle axle, 2 the axle housing and 3 the housing for the differential gearing such as is now commonly used in automobile practice.

The side frame bars 4 of the body supporting frame are sustained in yielding relation to the rear axle and its housing by means of springs 5 shown as of the semi-elliptical form. All parts thus far described are of the usual construction and arrangement.

Figure 2:
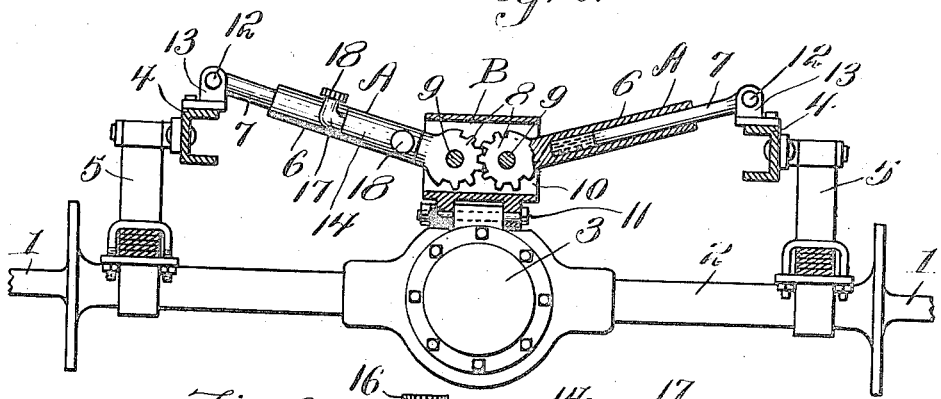
Fig. 2 is a cross section through the same taken adjacent to the rear axle.

In carrying out this invention, in the preferred embodiment thereof, I employ a pair of equalizing members A each shown in the form of a pivoted and swinging arm and each being of telescopic formation, comprising a tubular member 6 and a plunger 7 mounted to reciprocate or slide therein. The inner members 6 of the arms A are provided with sector gear faces 8 preferably formed integrally therewith and intermeshing with each other as clearly shown in Fig. 2. The sector gear ends of the equalizing members A are mounted on journals 9 shown in the form of short shafts carried by a centrally arranged bracket designated generally at B and comprising the plates or front and rear walls 10 which are arranged in spaced relation to each other, the sector gear portions of the arms being arranged between the plates or walls 10 and the latter serving as supporting means for the journals 9.

The bracket B is connected to the rear axle housing 2 at the top of the differential housing 3 by means of a horizontally disposed pivot 11 which extends parallel to the axle 1 and at right angles to the journals 9. The pivot 11 in connection with the journals 9 forms a joint between the equalizing members and the rear axle housing which is in effect a universal joint.

The outer extremities of the outer members 7 of the arms A are connected by pivots 12 to brackets 13 or the equivalent thereof fastened to the side frame bars 4 of the body supporting frame. In view of the fact that the equalizing members A are positively geared together at their inner ends, when one of said arms is depressed or elevated, the other arm or equalizing member is correspondingly, simultaneously and equally elevated or depressed. This causes the body of the vehicle to be maintained in parallelism with the rear axle under any and all conditions thus preventing the body from tilting sidewise and throwing undue twisting strains on the body as well as the running gear and also rendering the steering operation much easier as there is no tendency to cramp the operative elements of the steering mechanism.

Figure 3:
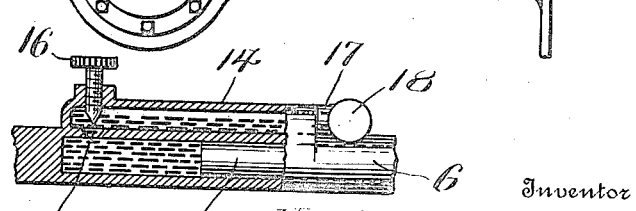
Fig. 3 is a fragmentary longitudinal section through the inner end of one of the equalizing members.

Each of the equalizing members A is equipped with means for checking or cushioning the swinging movements thereof. In this connection it will be noted in Fig. 3 that each tubular member 6 is formed with a fluid chamber 14 extending longitudinally of the inner end portion thereof and communicating with the inner end of the tubular member 6 by means of a port 15 the size of which is controlled by a regulating valve 16, the chamber 14 being provided with a filling nozzle 17 having a detachable cap 18. Each plunger 4 acts in the capacity of the plunger of a pump, the fluid or liquid contained in the inner end of the member 6 and in the chamber 14 forming a cushion which yieldingly resists the inward movement of the plunger 7. By means of the regulating valve 16, greater or less fluid or liquid is permitted to pass through the port 15 and this enables the cushioning means to be regulated in accordance with the load imposed on the body of the vehicle. In the outward movement of the plunger 7, there is a tendency to create a vacuum in the inner end of the respective tubular member 6 thereby yieldingly resisting said outward movement of the plunger. Thus both the inward and outward movement of each plunger is yieldingly resisted so as to enable the springs 5 to gradually absorb the relative movement between the axle and the body of the vehicle, relieving the body from sudden jars and shocks and also relieving the wheels, axles and other parts of the running gear.

From the foregoing description, taken in connection with the accompanying drawings, it will now be understood that the body of the vehicle is forced to move upwardly and downwardly in parallel relation to the axle or axles, each of the side bars of the body support being caused to move upwardly or downwardly an equal amount. Thus the load is simultaneously imposed upon the body supporting springs at opposite sides of the machine. The device also prevents the usual side swaying of the car body thereby saving the tires and wheels from undue lateral stresses. If desired, the bracket B containing the sector gears and journals may be inclosed within a suitable casing or cover indicated at 19. Any suitable liquid may be introduced into the chambers 14 and the inner ends of the equalizing members A such as oil, light or heavy, depending upon the desire of the manufacturer and the load. Due to the usual side swaying of the car body and the tendency thereby to cramp certain elements of the steering mechanism, a vehicle equipped with the present invention will enable the steering operation to be carried out with much less physical effort.

I do not desire to be limited to the details of construction hereinabove set forth and shown as it will be apparent that changes may be made in the form, proportion and minor details of construction without departing from the principle or sacrificing any of the advantages of the invention.

I claim:—

1. The combination with a vehicle axle, and a vehicle body yieldingly supported in relation thereto, of body stabilizing means interposed between said body and axle and serving to cause a uniform up and down movement of the body in relation to the axle, said stabilizing means embodying equalizing telescopic members each pivotally related to the body and axle, and means enforcing an equal and simultaneous movement of said equalizing members.

2. The combination with a vehicle axle, and a vehicle body yieldingly supported in relation thereto, of body stabilizing means interposed between said body and axle and serving to cause a uniform up and down movement of the body in relation to the axle, said stabilizing means embodying equalizing telescopic members each pivotally related to the body and axle, and means enforcing an equal and simultaneous movement of said equalizing members, the joint between the axle and said equalizing members being of the universal type.

3. The combination with a vehicle axle, and a vehicle body yieldingly supported in relation thereto, of body stabilizing means interposed between said body and axle and serving to cause a uniform up and down movement of the body in relation to the axle, said stabilizing means embodying equalizing members each having a jointed relation to the body and axle, and means enforcing an equal and simultaneous movement of said equalizing members, each of said equalizing members having selfcontained cushioning means.

4. The combination with a vehicle axle, and a vehicle body yieldingly supported in relation thereto, of body stabilizing means interposed between said body and axle and serving to cause a uniform up and down movement of the body in relation to the axle, said stabilizing means embodying telescopic equalizing members each having a jointed relation to the body and axle, and means enforcing an equal and simultaneous movement of said equalizing members, each of said equalizing members being provided with cushioning means to resist the telescopic action thereof in proportion to the load imposed on the body-supporting means.

In testimony whereof I affix my signature.

HERBERT HESS.